M. B. DYOTT.
Street-Lamps.

No. 137,538.  Patented April 8, 1873.

WITNESSES:
Benj. Morison.
Wm. H. Morison.

INVENTOR:
Michael B. Dyott

UNITED STATES PATENT OFFICE.

MICHAEL B. DYOTT, OF PHILADELPHIA, PENNSYLVANIA.

IMPROVEMENT IN STREET-LAMPS.

Specification forming part of Letters Patent No. 137,538, dated April 8, 1873; application filed June 10, 1872.

*To all whom it may concern:*

Be it known that I, MICHAEL B. DYOTT, of the city of Philadelphia, in the State of Pennsylvania, have invented certain Improvements in Street-Lanterns, of which the following is a specification:

The first part of my invention relates to the mode of supporting the glass globe in position within and between two rings, (an upper and a lower one,) which are secured permanently to upright rods which rest in the lantern-post, the lower end of the glass globe being made with an outside projection around above the opening in the said lower end, and an elastic packing of cloth or other like elastic material being secured between the glass and the ring, the upper or widest portion of the glass globe being, at the same time, supported concentrically within the upper ring by means of springs secured to the inner side of said ring so as to leave an annular air-space between the globe and the ring; the object of this part of my invention being to support the glass globe firmly in its proper position within the frame which rises from the lantern-post and supports the dome, and at the same time to allow for the contraction and expansion of the globe or glass without liability of the same to become cracked or broken in consequence of variations in its temperature or sudden blasts of wind impinging against the same. The second part of my invention relates to the combined arrangement of the dome and the glass globe beneath it with the supporting-ring and the springs attached to the latter; the object of this part of my invention being to preserve the required stability of the dome and the upper end of the glass globe in their relation to each other and to a cold-air space between them. The third part of my invention relates to the combination of a glass globe and a chimney with a protecting or covering dome over the glass globe, which leaves an open air-space between the said globe and dome, and with deflecting weather-bonnets over the chimney and air-space; the object of this part of my invention being to afford protection of the upper portion of the glass globe from hail-stones or other falling bodies by the covering-dome, and from becoming too much heated by the flame of the lantern by the passage of cool air between it and the dome; and also, by means of the weather-bonnets, protecting the air-passage and hot-air flue from rain, hail, or snow, and blasts of downward currents of air.

Figure 1:
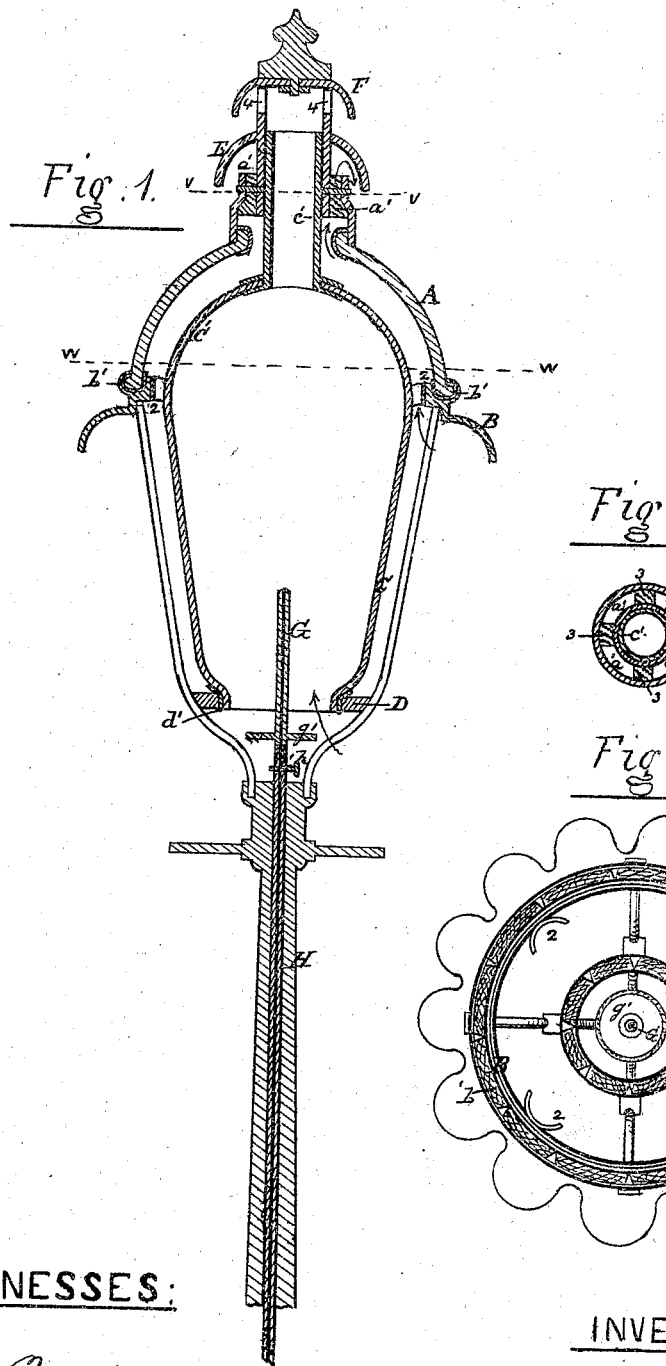
Figure 2:
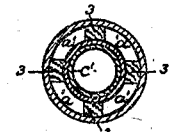
Figure 3:
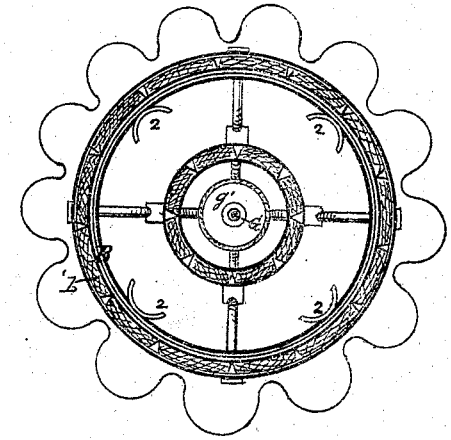

Figure 1 is a vertical central section of a mounted street-lantern embodying my invention. Fig. 2 is a horizontal section through the dotted line $v\ v$ of Fig. 1. Fig. 3 is a plan view below the dotted line $w\ w$ of Fig. 1.

The dome A rests upon the ring B, with a layer of cloth, $b'$, or other similarly soft elastic material between to prevent direct contact and afford a soft cushion for the lower edge of the dome. The glass globe C rests with its open bottom end within the lower ring D, with a layer of cloth, $d'$, or any other soft elastic material between. The upper portion of the globe C is kept concentrically within the ring B by means of the springs 2 2; and the hot-air flue $c'$ is fixed to the open upper end of the globe C, and extends vertically upward through the cold-air flue $a'$, which conducts the cold air which passes upward between the dome A and globe C to outlet beneath the deflector E. The isolating blocks of wood 3 3 are fixed between the said cold-air flue $a'$ and the hot-air flue C, as shown in Fig. 2, and prevent the hot-air flue from transmitting heat to the cold-air flue. Above the cold-air deflector E the outlets 4 4 are made, and just above the openings 4 a small deflecting-cover, F, is fixed, which prevents the entrance of rain into the hot-air flue, the larger deflector E preventing the hot air from being thrown down upon the dome A. The burner G screws into the gas or conduit pipe of the post H at a point just above the valve or stop cock $h'$. The thumb-and-finger wheel $g'$ is fixed to the burner G at a point sufficiently below the bottom opening of the globe C to allow the required free entrance of air into the said globe.

The object of the wheel $g'$ is to afford ready and always present means for detaching and reattaching the burner to afford access to the interior of the said globe C through its bottom opening, for the purpose of cleaning the interior surface of the glass, and thus to dispense with the necessity of carrying a wrench or pliers for the purpose of unscrewing and screwing the burner.

I claim as my invention—

1. The ring B with its series of springs 2 2, and the ring D with its elastic packing $d'$, in combination with the frame of the lantern, substantially as set forth, for the purpose of supporting the glass globe C, in the manner described.

2. The dome A and glass globe C, in combination with the ring B and its series of springs 2 2, the same being constructed and arranged to operate together as and for the purposes hereinbefore set forth.

3. The combination of the glass globe C, its chimney $c'$, the dome A, and the air-space between the said globe and dome with the deflecting weather-bonnets E and F, the said parts being arranged substantially as and for the purposes hereinbefore set forth and described.

MICHAEL B. DYOTT.

Witnesses:
BENJ. MORISON,
WM. H. MORISON.